United States Patent [19]
Bateman et al.

[11] Patent Number: 4,727,249
[45] Date of Patent: Feb. 23, 1988

[54] MAGNETIC SECTOR MASS SPECTROMETER

[75] Inventors: Robert H. Bateman, Knutsford; Peter Burns, deceased, late of Stockport, both of United Kingdom, by Maureen Burns, executrix

[73] Assignee: VG Instruments Group Limited, Crawley, United Kingdom

[21] Appl. No.: 863,356

[22] Filed: May 15, 1986

[30] Foreign Application Priority Data

May 15, 1985 [GB] United Kingdom ................ 8512252

[51] Int. Cl.⁴ ............................................ B01D 59/44
[52] U.S. Cl. .................................... 250/299; 250/298
[58] Field of Search ............... 250/281, 296, 297, 298, 250/299, 300, 356 ML

[56] References Cited

U.S. PATENT DOCUMENTS 3,356,976 12/1967 Sampson et al. .................... 250/298
4,251,728 2/1981 Pfeiffer et al. ............. 250/396 ML

OTHER PUBLICATIONS

Fadley, C. S., Healey, R. N., Hollander, J. M., Miner, C. E., J. Appl. Phys., 1972, vol. 43, pp. 1085–1088.

Ken-ichi Kanazawa, Tatsuo Arikawa, Shitsuryo Bunseki, 1982, vol. 30 (4), pp. 281–287.

Enge, H. A., "Deflecting Magnets", in The Focusing of Charged Particles, Ed. A. Septier, Academic Press, New York, 1967, pp. 203–263.

*Primary Examiner*—Bruce C. Anderson
*Attorney, Agent, or Firm*—Schwartz, Jeffery, Schwaab, Mack, Blumenthal & Evans

[57] ABSTRACT

The invention relates to a mass spectrometer having a magnetic sector analyzer in which the magnetic field is developed neither by a permanent magnet nor by an electromagnet having the conventional ferromagnetic core. In particular, the spectrometer has a magnetic sector analyzer through which ions of a mass-to-charge ratio selected by said analyzer may travel along a substantially circular trajectory disposed in a first plane, said analyzer comprising at least two electrical conductor portions of substantially circular arcuate form, respectively of greater and smaller radius than said circular trajectory and disposed on radially opposite sides of a curved plane which is aligned with said circular trajectory and perpendicular to said first plane, and wherein substantially all of the magnetic flux generated by the passage of electrical current through said conductor portions passes only through non-ferromagnetic materials.

28 Claims, 9 Drawing Figures

FIG.3.
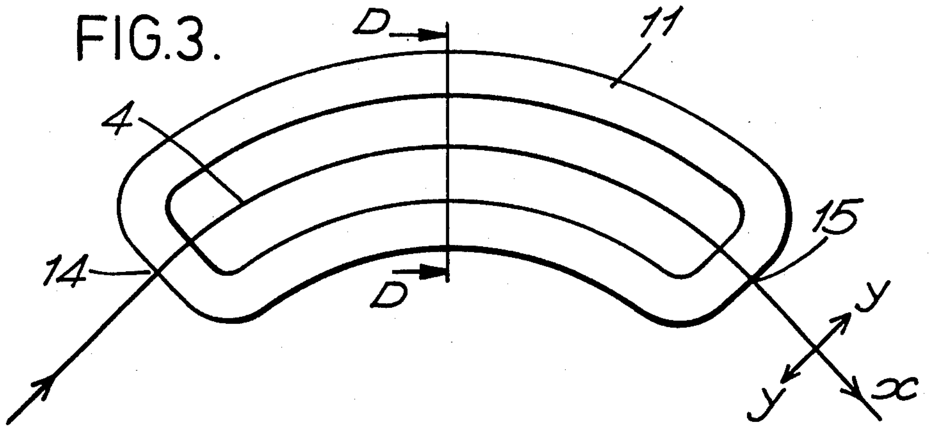
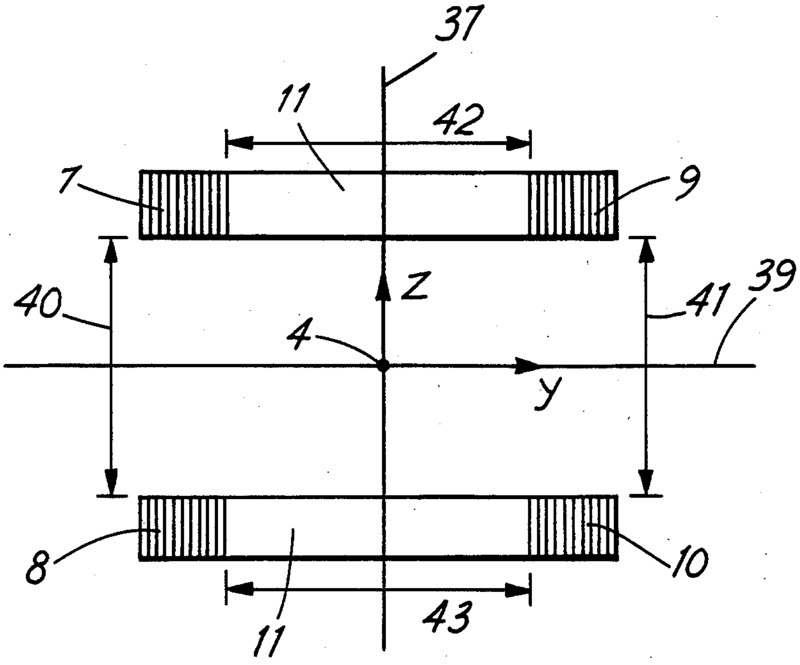
FIG.4A

MAGNETIC SECTOR MASS SPECTROMETER

This invention relates to mass spectrometers having a magnetic sector analyzer, and to an electromagnet used to generate the magnetic field required by such a spectrometer.

In a magnetic sector analyzer a beam of ions is deflected by a magnetic field by an amount dependent on the mass to charge ratio of the ions after the beam has been accelerated through an electrical potential gradient. If the magnetic field is homogeneous, the trajectory of the ions is circular and of radius proportional to the square root of the mass to charge ratio of the ions. Ions of different mass to charge ratios are selected by fixing the radius of the sector analyzer by means of narrow slits and changing the strength of the magnetic field. As well as its dispersive properties, however, a magnetic sector analyzer also has focusing properties, and can be made to form an image of a source of ions providing that the field boundaries are correctly shaped relative to the position of the source and object slits. The design of magnetic sector analyzer which take advantage of these properties is of course well known in the art, but as far as we are aware every magnetic sector mass spectrometer with a mass range high enough for organic chemical analysis so far constructed and reported in the literature has employed either a permanent magnet or an electromagnet with a ferromagnetic (usually iron) core to generate the magnetic field.

Such instruments suffer from two important disadvantages. First, the inductance of a large electromagnet with an iron core is high, and a limit is consequently placed on the speed at which the field can be varied, even when expensive and complicated power supplies are used, and the core is laminated to reduce eddy currents. The speed at which a mass spectrum can be scanned is therefore limited, which is of particular concern in gas chromatography-mass spectrometry instruments. Secondly, and most seriously, the hysteresis inherent in an electromagnet of this type means that there is no simple linear relationship between the current through the electromagnet coils and the field between its poles. Indeed, the actual relationship is different when the field is being increased compared with when it is decreased. In order to overcome the effects of hysteresis a complicated calibration procedure has to be used. This involves admission of a reference compound to the spectrometer, which generates a series of peaks of accurately known mass to charge ratio in the resultant mass spectrum, in order to permit the accurate determination of the mass to charge ratio of peaks due to the sample. Some form of magnetic field sensor, such as a Hall effect probe, is also frequently used to provide a visual indication of the mass to charge ratio of ions being transmitted through the sector and to control the current through the electromagnet coils so that the transmitted mass is forced into a known relationship to time, providing a calibrated scan. When the spectrometer is being used in the mode known as "peak switching" or "multiple ion detection," the magnetic field has to be set in a stepwise fashion in turn to each of the masses to be monitored. Because of the problems described, the maximum speed at which this can be done with conventional instruments falls short of that which is desirable, despite the use of complicated control circuitry and calibration procedures. In this respect, therefore, the performance of magnetic sector instruments is inferior to that of quadrupole mass analysers. A further problem is that the hysteresis of the iron cored magnet limits the precision to which the magnetic sector can be set to transmit a particular mass, irrespective of the speed at which this is done. Consequently, operation at very high resolution in the peak switching mode is in general impossible with conventional instruments.

Although it is not difficult to see that use of an electromagnet which did not have a ferromagnetic core would greatly alleviate, if not eliminate, these problems, no such instrument has been described. This is presumably because it is clear that the design of a non-ferromagnetic cored beam focusing magnet is a complex problem (as explained below), not worth attempting in view of the fact that the strength of the field required to obtain a mass range adequate for organic mass spectrometry with a reasonably sized spectrometer is so high that it can only be obtained with an iron cored electromagnet. However, a high resolution double focusing mass spectrometer having a very large magnetic sector radius but a small physical size has now been developed (described in co-pending application Ser. No. 862,263), a copy of the specification of which is on the file of the present application), and such an instrument, which requires a much lower magnetic field in order to achieve the necessary mass range, is clearly ideally suitable for use with a non-ferromagnetic cored magnet. The chief problem in the design of a non-ferromagnetic cored magnet for beam focusing applications is that the field produced by it does not have the sharply defined boundaries of that produced by a magnet with iron poles, but it is still necessary for it to be shaped to produce a very accurate and sharply defined focus at a position which can be calculated, so that a complete mass spectrometer can be designed. Because it is not possible to adjust the field by varying such parameters as pole face curvature and inclination, the well established prior art on the design of beam focusing magnets with iron cores is not applicable. Only in the field of electron spectrometry have non-ferromagnetic cored magnets been used for comparable beam focusing applications, and in this case the field required is a cylindrical field inversely proportional to the square root of the radial co-ordinate, for example as described by Fadley, C. S., Healey, R. N, Hollander, J. M., and Miner, C. E., in J. Appl. Phys 1972, vol. 43 p 1085-8. This is quite unlike the linear homogeneous field used in a magnetic sector mass analyzer.

Thus it is not apparent from the prior art whether it would be possible to design a non-ferromagnetic cored magnet for a mass spectrometer, nor whether such a magnet could be made to give a sufficiently well focused image to allow second order aberrations to be corrected. It is still less clear which parameters defining its physical construction could be adjusted to correct second order aberrations, and to produce a velocity focused image if the magnetic sector forms part of a double focusing mass spectrometer.

It is an object of the present invention to provide a magnetic sector mass spectrometer having an electromagnet with a non-ferromagnetic core and which is consequently largely free from the defects attributable to iron cored magnets, described previously.

In accordance with this objective there is provided a mass spectrometer having a magnetic sector analyzer through which ions of a mass to charge ratio selected by said analyzer may travel along a substantially circular trajectory disposed in a first plane, said analyzer comprising at least two electrical conductor portions of substantially circular arcuate form respectively of greater and smaller radius than said circular trajectory and disposed on radially opposite sides of a curved plane which is aligned with said circular trajectory and perpendicular to said first plane, and wherein substantially all of the magnetic flux generated by the passage of electric current through said conductor portions passes only through non-ferromagnetic materials. In this way a magnetic field which is substantially homogeneous along the direction of travel of the ions (the x direction) is created, so that the trajectory of the ions is substantially circular. If the axis along which the ions are dispersed by the sector is defined as the y axis, then if the conductors are symmetrically placed about the x-y plane (the said first plane) the circular trajectory will be confined to this plane. Thus the trajectory of the ions through the magnetic sector analyzer is similar to the trajectory of ions through an analyzer equipped with a conventional iron-cored magnet, which facilitates the incorporation of the magnet in a complete mass spectrometer.

Preferably the first plane is a plane of mirror symmetry and further preferably the conductor portions should be disposed symmetrically about the z axis (defined as the axis mutually perpendicular to the y axis and the circular arc defined as the x direction), in every y-z plane along the x direction. This allows the advantages of the invention to be realized when the same current is passed through each conductor portion, which is particularly convenient in practice.

A further preferred embodiment of the invention comprises four conductor portions, disposed on opposite sides of the x-y plane and with no conductors in the x-y plane itself. This form of the invention has an additional advantage which is described in detail below. In a still further preferred form the conductor portions on one side of the x-y plane are linked in pairs, and those on the other side are linked in pairs, to form single-turn arcuate coils having a substantially part-circular major axis aligned with the circular trajectory of the selected ions but displaced from it along the z axis.

Preferably each of the conductor portions is a composite comprising a plurality of electrical conductors so that the preferred form the the electromagnet comprises two arcuate multi-turn coils disposed on respective sides of the x-y plane, with the major axis of the coils aligned with the circular ion trajectory. In order to permit sufficient current to be passed through the coils, the conductors should preferably be strips of an elongate rectangular cross section, disposed with their longest dimension lying parallel to the z axis and wound in the manner of a roll of tape on an arcuate former. The coils should preferably be cooled by means of an non-ferromagnetic plate of good thermal conductivity containing passages through which a coolant can be circulated diposed in good thermal contact with the edges of the conductors forming each coil, but electrically insulated therefrom. Thus, by increasing the number of conductor portions and forming them into coils in the manner described, the magnetic flux can be increased to the value required without the need for a very high current to be passed through one or two pairs of conductors. It is also possible to use multiturn coils which extend away from the ion trajectory along the z axis. The cross section of these coils must of course be such that the basic requirements of the invention are met. They are less preferred, however, because many of the turns will be situated too far from the ion trajectory to contribute significantly to the field strength of the magnet.

In every case however, it is important that the magnetic flux generated by the coils does not pass through any ferromagnetic material if the advantages of the invention are to be fully realized. It is necessary therefore to ensure that the frame of the magnet itself, and the base of the mass spectrometer, etc, are made of a non-ferromagnetic material, e.g. aluminium or stainless steel, in the vicinity of the magnet. For the purposes of the present specification and claims "non-ferromagnetic materials" are materials which are either entirely non-ferromagnetic or are only barely ferromagnetic, e.g. materials such as aluminium and stainless steel.

In order to incorporate the sector analyzer into a mass spectrometer, it is necessary to calculate the positions of the image and object of the sector which result in the most sharply focused image. The method by which this is achieved can be understood by reference to the following equation, which represents the focusing behaviour of any magnetic sector analyzer.

$$y/r_m = B_1\alpha + B_2\beta + B_{11}\alpha^2 + B_{12}\alpha\beta + B_{22}\beta^2 \quad [1]$$

In equation [1], y is the deviation of the focused beam from the median ion path in the analyzer, $r_m$ is the radius of the median ion beam, $\alpha$ is the initial angle between another ray and the median ion beam, $\beta$ is the relative velocity deviation ($\Delta v/v_o$) of the ions in that ray compared with the velocity $v_o$ of the ions in the median path, $B_1$ and $B_2$ are the first order angular and velocity aberration coefficients, respectively, and $B_{11}$, $B_{12}$, and $B_{22}$ are the second order angular, angular and velocity, and velocity aberration coefficients respectively. The values of these coefficients are known and are related to the physical parameters of the magnetic sector (see, e.g., H. A. Enge, "Deflecting Magnets" in "The Focusing of Charged Particles," Ed. A. Septier, Academic Press, New York, 1967, pages 203–263), and it is necessary to minimize as many of the coefficients as possible to obtain the sharpest possible image.

The first order term $B_1$ is made equal to 0 by selection of the image and object positions, and this is greatly facilitated if the trajectory is circular and the field is homogeneous along the x direction as required by the invention. Other advantages which result from the use of a homogeneous field include the production of the maximum possible field strength for a given spacing of conductor and a given current through them, and the possibility of correcting second order aberrations by the methods outlined below. In the case of a magnetic sector analyzer, $B_2$ is fixed and cannot be varied by adjustment of any of the magnetic sector parameters. It is of course compensated in a double focusing spectrometer (in which $B_1 = B_2 = 0$ for the final image) by combination with an electrostatic analyser. Of the second order terms, $B_{11}\alpha^2$ is usually the largest term because $\alpha$ is usually greater than $\beta$ in practice. In order to understand how the coefficient $B_{11}$ can be minimized in a spectrometer constructed according to the invention it is necessary to understand the effect of an inhomogeneity in the magnetic field along the y axis in the magnet used, and how the homogeneity of the field can in practice be controlled.

Enge has shown that in an iron cored magnet the effect of a first order inhomogeneity, that is a linear variation of field strength along the y axis, has the effect of making $B_1 \neq 0$, but that another trajectory exists which produces an image with $B_1 = 0$ at a different position. Thus in effect, introduction of a first order inhomogeneity along the y axis changes the focal length, and therefore the image and object distances of the magnet. With an iron cored magnet, an inhomogeneity of this type can be introduced by using a tapered gap between the poles of the magnet. In the case of a magnetic sector analyzer with a magnet of the type described herein, a first order inhomogeneity has an exactly similar effect, and it is possible to exploit this in the following way.

The inventors have found that in the present magnet there is not first order inhomogeneity along the y axis providing that the conductor portions are arranged in equal numbers on each side of the ion trajectory, and the spacing from the x-y plane of each of said conductor portions on one side of said trajectory is equal to the spacing of another conductor portion from the x-y plane on the other side of said trajectory. If the conductor portions are formed into respective coils on opposite sides of the x-y plane as is preferred, this requirement is met when the plane of each coil is parallel to the x-y plane. In this way there will be no first order inhomogeneity along the y axis at any point along the x direction (i.e. the curved median trajectory of the ions), and the focal length of the magnet will be equivalent to that of an iron cored magnet of similar field strength of a certain sector angle slightly greater than the actual sector angle of the magnet of the invention, (because of the increased contribution of the fringing fields in the case of the non-ferromagnetic cored magnet). These values can be used in the conventional equations for the design of a mass spectrometer, but it is necessary first to compute the actual value of the effective sector angle. This is done by first calculating the field due to all the conductor portions which form the magnet and performing a series of integrations to obtain the actual value of the field along the central trajectory. This is a laborious procedure but involves only the application of well established physical and mathematical principles. The effective sector angle is then that of a conventional iron cored magnet with the same value of integrated field along the central trajectory, and it is then possible to calculate the image and object positions for the magnetic sector analyzer to obtain the desired magnification and dispersion following the conventional procedure. In practice it is desirable to use conventional electrostatic lenses to vary these distances. It is then unnecessary to compute the field integral very accurately and any inaccuracies in construction of the magnet itself can be compensated. It will be appreciated that with a magnet of this type there is no simple adjustment which can be made in order to compensate for errors which affect the focal length, unlike the case of the iron cored magnet where this can be adjusted by moving the magnet along an axis which bisects the sector angle. However, as previously explained, the focal length can be varied by deliberately introducing a first order inhomogeneity in the field, e.g. by making the z axis spacing of the conductor portions from the x-y plane on one side of the trajectory different from those on the other side while maintaining the symmetry about the x-y plane. Thus the invention further comprises a mass spectrometer as previously defined having four conductor portions, in which a first distance separates the conductor portions on one side of said curved plane and a second distance separates the conductor portions on the other side of the curved plane, and in which said first and second distances differ by an amount selected to set the focal length of the analyzer to a desired value.

Enge has also shown that in the case of an iron cored magnet it is possible to reduce the second order aberration coefficient $B_{11}$ by introducing curvature on the pole faces of the magnet so that a stronger focusing action is provided for rays with a larger value of $\alpha$. With a magnet without an iron core, such a procedure is impossible. The inventors have found, however, that it is possible to substantially reduce this term by the deliberate introduction of a second order inhomogeneity in the field along the y axis (i.e, one in which the field varies in proportion to $y^2$) by selection of the spacing of the conductors either in the y direction or the z direction while maintaining equal spacing from the x-y plane or x-z plane on both sides of the ion trajectory. In order to obtain the optimum field along the y dispersion axis it is therefore necessary to select both the values of the conductor spacing along the y axis and along the z axis and also the actual shape and cross sectional area of the conductors or coils, since all these parameters interact to control the homogeneity of the field along the y axis. Clearly if the second order inhomogeneity is not correctly selected, then the $B_{11}$ term may be larger than if the field were homogeneous.

Thus a further preferred embodiment of the invention comprises a mass spectrometer as previously defined having four conductor portions in which a third distance separates the conductor portions on one side of said first plane and a fourth distance separates the conductor portions on the other side of said first plane, and in which said third and fourth distances are both selected to substantially minimize at least some of the second order aberrations of the final image produced by the spectrometer.

In practice, however, it is more convenient to adjust the spacing of the Z conductor portions along the axis in order to minimize second order aberrations, so that the invention further comprises a mass spectrometer as previously defined in which a fifth distance separates the conductor portions on one side of said curved plane and a sixth distance separates the conductor portions on the other side of said curved plane, and in which said fifth and sixth distances are both selected to substantially minimize at least some of the second order aberrations of the final image produced by the spectrometer.

Preferably the spacing of the conductors is made adjustable so that the resolution can be optimized by adjusting the spacing while the spectrometer is operating. Preferably also the conductor portions are formed into coils in the manner previously described, and further preferably electrostatic lenses are provided on either side of the magnetic sector in order to adjust the image and object distances of said magnetic sector.

In practice it is necessary to select the dimensions of the conductor portions or coils to give approximately the correctly shaped field, and then to arrange for either the y spacing (e.g. the third and fourth distances referred to above) or the Z spacing (e.g. the fifth and sixth distances referred to above), or possibly both, to be adjustable, so that an, so that an accurately focused image can be produced by experimental adjustment. The cross sectional area of the conductor portions or the coils is usually determined by the practical considerations such as the minimum area needed to pass the maximum current through the magnet without excessive power dissipation. Further, increasing the number of turns beyond a certain point increases the power dissipation in the coil without contributing significantly to the field because the outer turns are of necessity further from the ion trajectory and contribute little to the effective field. Further, in the preferred embodiment of the invention in which coils above and below the x-y plane are provided, the minimum z spacing is clearly determined by the vacuum envelope of the flight tube. In general it is more practical to provide means for adjusting the z spacing of the coils than to try and adjust the y spacing, which is fixed in winding the coils. Thus preferably the y spacing is decided in the design stage for a given z spacing slightly greater than the minimum allowed by the flight tube so that the calculated field is approximately correctly shaped, and means are then provided for adjusting the z spacing to optimize performance. The shape of the field along the y axis can be computed in the following way if the conductor portions or coils are regarded as an assembly of individual small elements. The resultant field from all the conductor portions is then the sum of contributions from all the individual small elements. The value of the field strength at points along the y axis can therefore be computed by calculating the field due to a wire of finite length and cross section $\delta y \times \delta z$ spaced at a distance of y and z along the y and z axes respectively from the desired point, and integrating this with respect to y and z between the limits $y_1$, $y_2$, $z_1$, and $z_2$ which define the boundaries of the actual conductor portion. The fields so obtained from each conductor portion are then added to obtain the resultant total field strength. This procedure, although fairly lengthy, should present no difficulty to those skilled in the art. In this way it is possible to calculate the profile of the field along the y axis, and it is apparent that the field will be dependent on the positions of all the conductor portions along the y and z axis and also on the physical dimensions and shape of each conductor portion.

It will also be appreciated that if the magnetic sector is incorporated in a double focusing mass spectrometer, adjustment of the conductor spacing along the z axis can be used to maximize the resolution of the final double focused image even if the magnetic sector is not the last sector. In this way second order aberrations of the electrostatic sector analyzer(s) can also be at least partly compensated.

Providing that the conductors on each side of the ion trajectory are maintained at an equal spacing along the z axis, this second order correction does not affect the first order position of the image produced by the sector. This is a very useful property which greatly simplifies the adjustment procedure. However, as previously explained, it is also within the scope of the invention to introduce a first order inhomogeneity in the field along the y axis so that the image position can be varied to assist in optimizing performance. Unfortunately, if this feature is employed it has to be introduced by the use of different spacings of the conductor portions on either side of the z axis, as explained. Consequently, if an attempt is made to adjust the z spacings of the conductors to both adjust the focal length and to correct the $B_{11}$ aberration term, the $B_{11}$ optimization adjustment will no longer be independent of the first order focusing adjustment, and the adjustment of the magnet for optimum performance becomes more difficult. Thus, although it is within the scope of the invention to adjust both the focal length and the $B_{11}$ abberation term in this way, it is preferable to use the z axis spacing to compensate only the $B_{11}$ aberration term and to incorporate separate electrostatic lenses disposed on either side of the magnetic sector. The use and construction of such lenses is conventional, and many suitable types are described in the literature.

It is also interesting to note that the correction of second order defects by adjustment of the z axis spacing of the coils is not possible in the case of an iron cored magnet.

In yet a further preferred embodiment, the invention provides a mass spectrometer as previously defined wherein on one side of said first plane, a seventh distance separates first conductor portions disposed on each side of said curved plane and an eighth distance separates one of said first conductor portions from said curved plane, and on the other side of said first plane, a ninth distance separates second conductor portions disposed each side of said curved plane and a tenth distance separates one of said second conductor portions from said curved plane, wherein said eighth and/or tenth distances are selected, eg. by the use of adjustment means, to set the angle between said first plane and a second plane equidistant from all said conductor portions and disposed on one side of said first conductor portions to a desired value.

By this selection of one of said eighth or tenth distances whilst said seventh, ninth and the other of said eighth or tenth distances are maintained constant, the plane of motion of the ions (the first, or x-y plane) can be made to coincide with the second plane (ie, the angle between the first and second plane can be made zero) so that any inaccuracy in the construction of the conductor portions or coils which would otherwise result in the first and second planes not coinciding can be compensated. Thus in the preferred form utilizing two coils on opposite sides of the x-y plane, it has been found that displacement along the y axis of one coil relative to the other causes the image to move along the z axis. Thus, although the preferred form of the invention requires that the conductor portions are symmetrically disposed about the y axis above and below the x-y plane, in practice inaccuracies in the positions or the cross sectional area of the conductors can result in the plane of motion of the ions being tilted, and this can be compensated by adjusting the displacement of the conductors along the y axis, as described.

An embodiment of the invention will now be described in greater detail by way of example only, and with reference to the following figures in which:-

FIG. 3 is a schematic view of an embodiment of the invention in which coils are employed to generate the magnetic field;

Figure 4B:
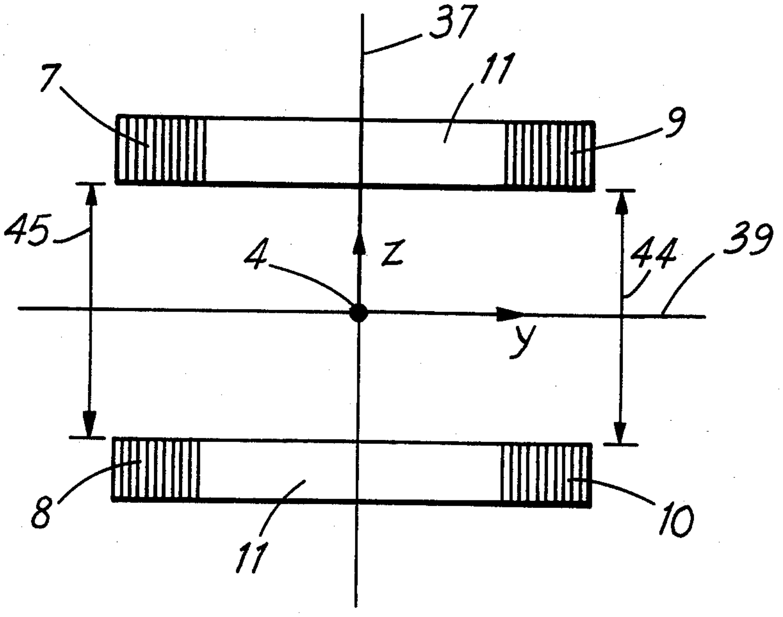
Figure 4C:
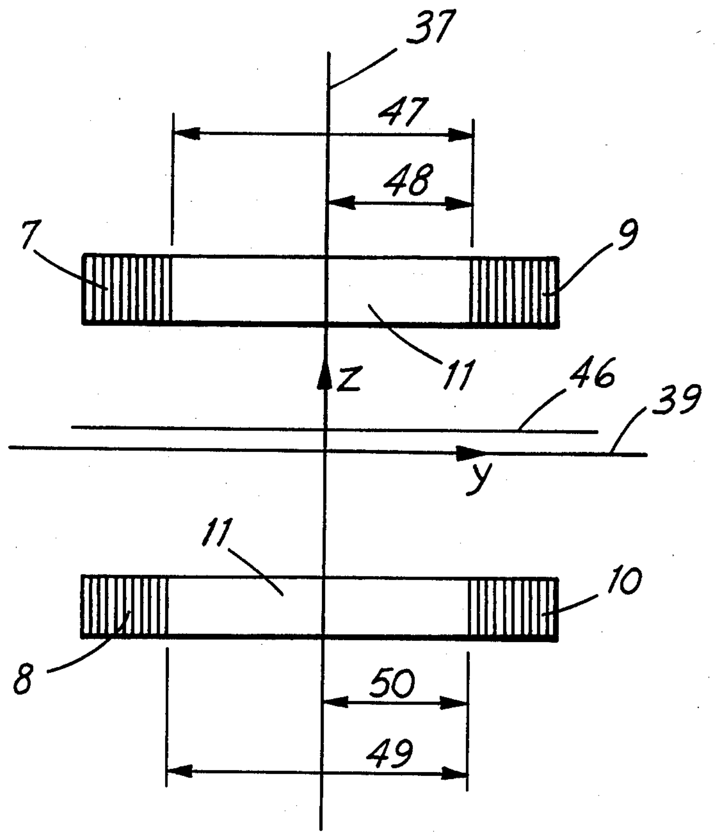
Figure 5:
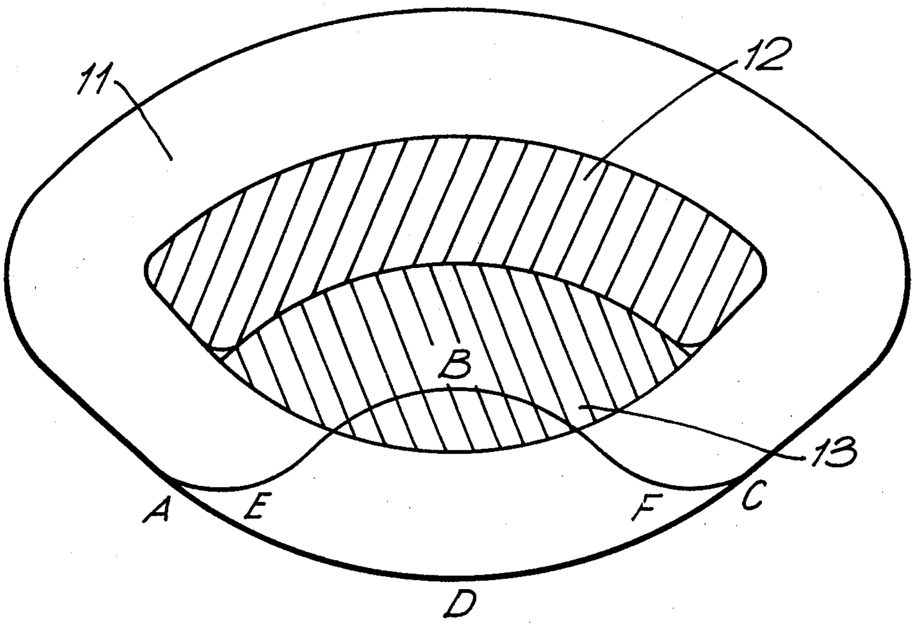

FIG. 4A, 4B, and 4C are sectional views along plane DD in FIG. 3 and viewed at right angles to it;

FIG. 5 is a drawing of a two part former used during the winding of coils which are suitable for use with the invention.

Figure 6:
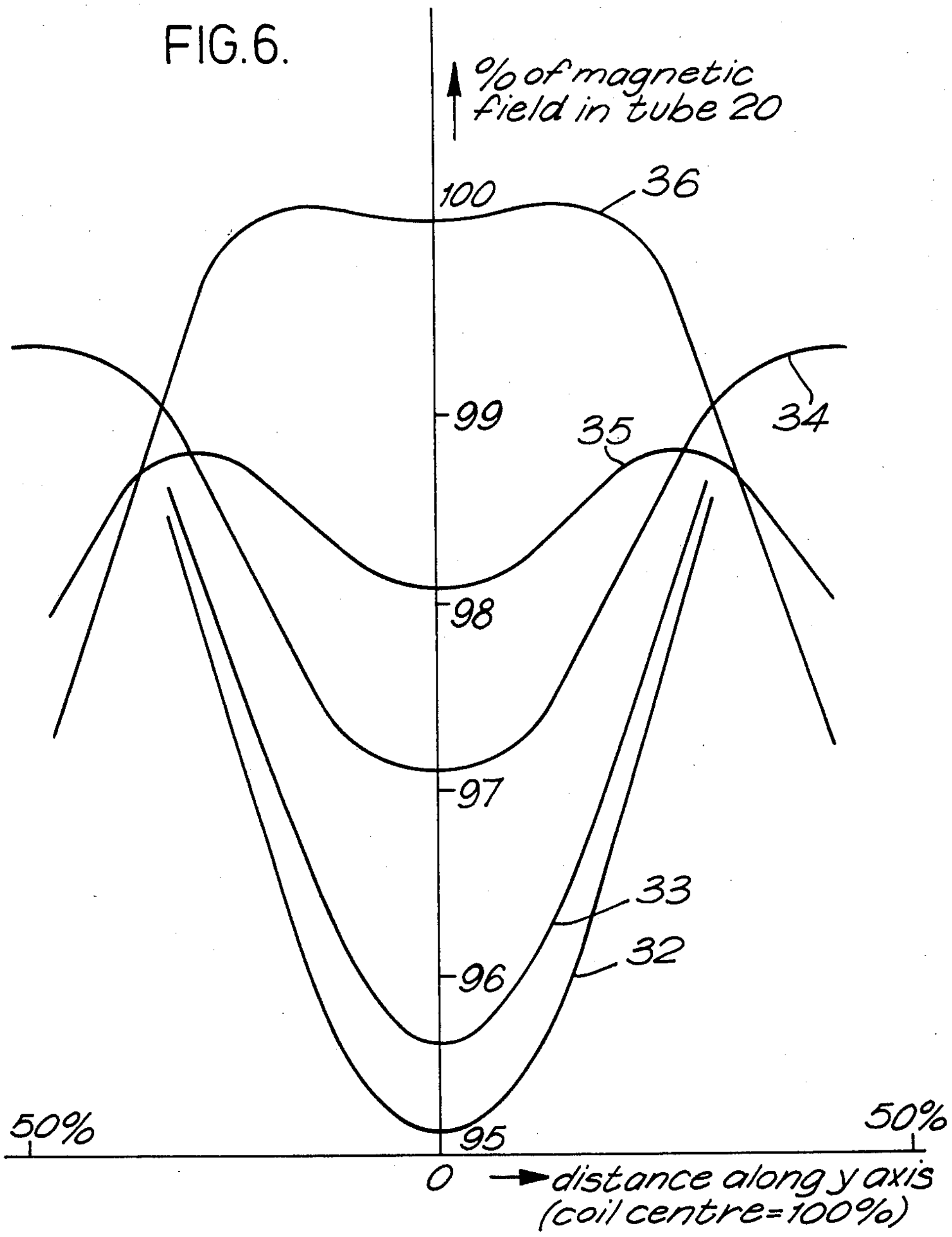
Figure 7:
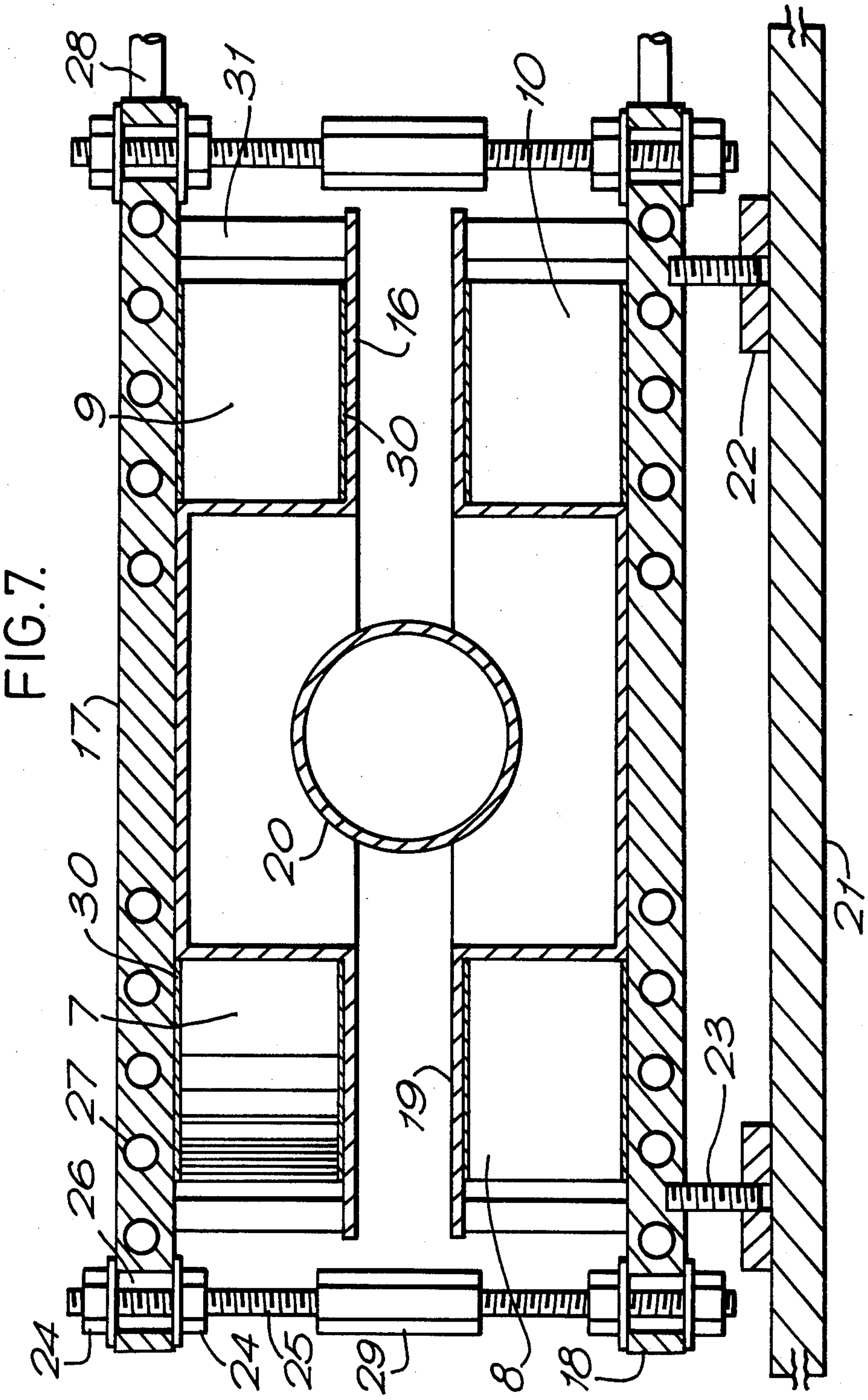

FIG. 6 is a plot of the field along the y axis for different values of conductor spacing along the y axis or the z axis; and FIG. 7 is a sectional view of a pratical version of a magnet suitable for use in the invention.

Figure 1:
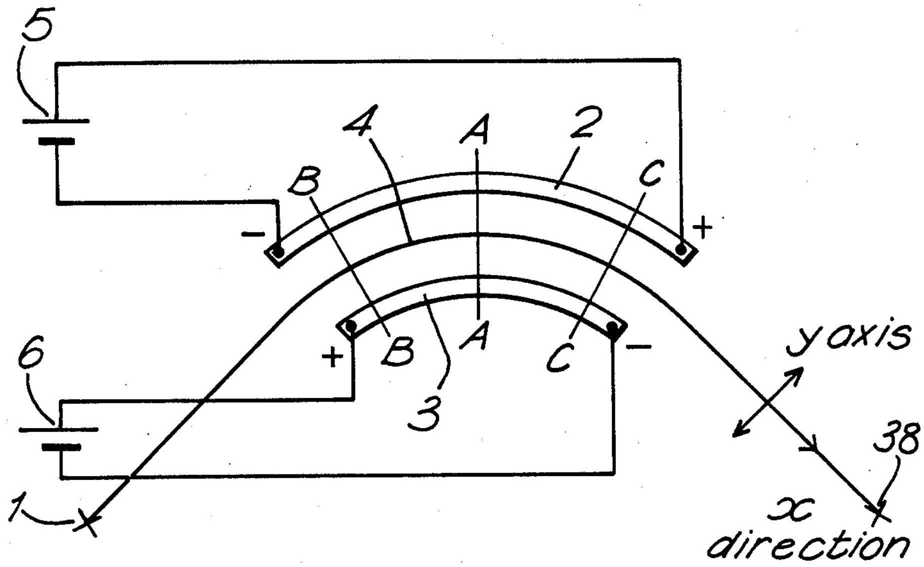
FIG. 1 is a schematic view of a mass spectrometer employing a simple version of the invention.
Figure 2:
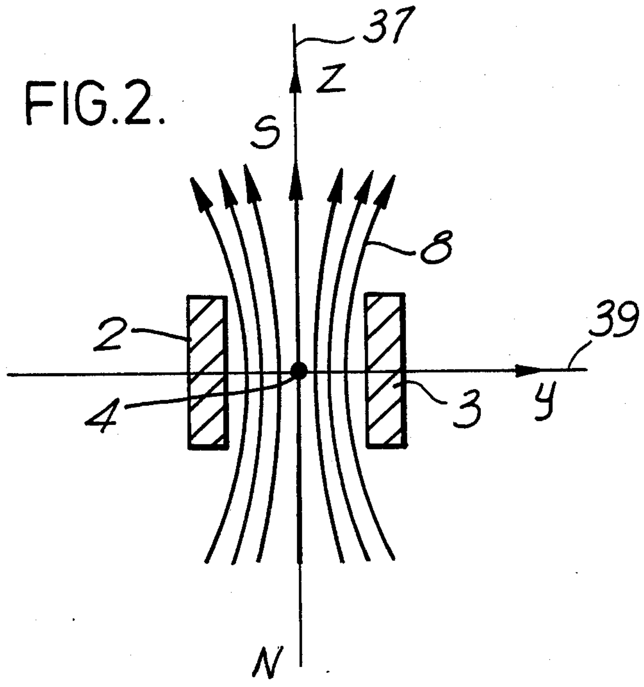
FIG. 2 is a cross section along any of the planes AA, BB or CC in FIG. 1, viewed along a direction at right angles to the plane.

Referring first to FIG. 1, an ion source 1 generates a beam of ions which travels along a substantially circular trajectory 4 in a curved plane 37 (see FIG. 2) to an ion detector 38 by virtue of the magnetic field generated by an electrical current passed through the conductor portions 2 and 3. These conductor portions are positioned according to the basic form of the invention so that the spacing between each conductor and the ion trajectory 4 is constant and the trajectory 4 and the conductors 2 and 3 are substantially circular arcs, so that an image of ion source 1 is formed at the ion detector 38. In practice, narrow slits are positioned at 1 and 38 as in a conventional iron cored magnetic sector analyzer. The magnetic field is generated by passing current through the conductors 2 and 3 in the direction shown from any suitable power supply (shown schematically in FIG. 1 by the batteries 5 and 6). The polarities are of course reversed if the ion beam is of negative ions. The conductor portions should be of low resistance to minimize the voltage drop across them and to minimize the power dissipation in them. In the simplest form of the invention, the conductor portions 2 and 3 are disposed symmetrically about the first plane 39 (the x-y plane), as shown in FIG. 2. This section is the same along planes AA, BB, or CC in FIG. 1 in accordance with the basic requirement of the invention. A magnetic field, represented by the lines of force 8, is generated between the conductors so that S and N poles are formed as shown.

As previously explained, the conductor portions 2 and 3 are preferably formed into coils 11 above and below the first plane 39, as shown in FIGS. 3 and 4A. Two such coils 11 are provided, as shown in FIG. 4. Thus in effect, four conductor portions 7, 8, 9 and 10 are provided, each comprising a plurality of conductors (the turns of the coil). Preferably the coils are wound with a copper tape of rectangular cross section, disposed with its longest edge at right angles to the x-y plane. Typically, tape about 0.5 mm thick is used, and the turns are insulated from each other by a thin layer of a suitable insulating film such as used in the manufacture of transformers.

In a preferred embodiment (see FIG. 4A), the spacing of the coils 11 along the z direction is made adjustable, and the difference between the first distance 40 (between conductor portions 7 and 8 on opposite sides of the first plane 39 and on the same side of the curved plane 37) and the second distance 41 (between conductor portions 9 and 10 which are on opposite sides of the first plane 39 and on the same side of the curved plane 37) is selected to set the focal length of the analyzer to a desired value, e.g., to focus the ions at detector 38. The y spacing of the conductors forming each coil (i.e., the third distance 42 between conductor portions 7 and 9 and the fourth distance 43 between conductors portions 8 and 10) may also be selected to minimize substantially at least some of the second order aberrations, as explained.

In an alternative preferred embodiment (see FIG. 4B), the spacing of the conductor portions along the z direction is adjusted to minimize second order aberrations, i.e., the fifth distance 44, which separates conductor portions 7 and 8 on one side of the curve plane 37, and the sixth distance 45, which separates conductor portions 9 and 10 on the other side of the curved plane 37, are both selected to minimize substantially at least some of the second order aberrations.

In a typical practical embodiment in which two coils disposed on opposite sides of the first plane 39 are provided, unavoidable errors in the construction of the coils can result in the ions travelling in a second plane 46 (see FIG. 4C) which may be inclined to the first plane 39. Thus the image formed by the magnetic field is displaced in the z direction. It has been found that the angle between the first plane 39 and the second plane 46 can be varied by varying the arrangement of the coils. Referring to FIG. 4C, one of either the eight distance 48 or the tenth distance 50 (respectively the distances between the curve plane 37 and the first and second conductor portions) may then be selected to set the angle between first plane 39 and second plane 46 to a desired value while the seventh distance 47 (between the first conductor portions), the ninth distance 49 (between the second conductor portions) and the other of said eighth and tenth distances is maintained constant. Preferably, the distances are selected to set the angle between the first and second planes substantially equal to zero.

Clearly, the manufacture of the coils 11 is not straightforward because it is impossible to wind then on a former of the shape required. For example they may be wound on a two part former 12, 13 as shown in FIG. 5. After winding, the part 13 of the former is removed, and force applied to point D on the coil 11 which will then take up the correct shape in close contact with part 12 of the former. The shape of the former is selected so that the length of the curve AEBFC followed by a turn of the finished coil is equal to the length of the curve ADC followed by that turn during winding, for each turn of the coil.

It will be seen that when the conductor portions are formed into coils, part of each coil must cross the iron trajectory 4. In the preferred form of the invention, the angle at which the ion trajectory 4 intersects the portion of the coils which cross the trajectory (points 14 and 15, FIG. 3) is made 90°. In this case the effect of these parts of the coil is mainly to reinforce the effect of the y and z spacing of the coils on the homogeneity of field along the y axis, described in detail below, because the coils are still symmetrical about the x axis in each y-z plane. The magnitude of the fringing fields along the x axis is also increased, but allowance for this can be made in calculating the effective sector angle of the magnet by means of the field integral, as explained. Thus the presence of these parts of the coils does not cause a significant difference in the focusing behaviour of the magnet in comparison with the simple embodiment shown in FIGS. 1 and 2, and the greater field strength for a given current obtainable by the use of coils reduces the current required for an adequate mass range to a more practical value. However, it is not essential for entrance and exit angles to the field to be 90°, and with a magnet of the type described changing this angle has a similar effect to changing the pole face inclination in a magnetic sector analyzer having an iron core. It is well known that a degree of z focusing can be introduced in this way so that in the case of the magnet of the invention, adjustment of the entrance and exit angles can also be carried out in order to cause some z focusing of the image, if not to make the magnet stigmatic (that is, capable of focusing in both the y and z directions). In many applications, however, the improvement obtained by utilizing this effect does not justify the additional complications of the design and the increased difficulty of manufacturing the coils.

As previously explained it is necessary to select the spacing of the conductors both along the y and the z axes in order to minimize aberations in the final image produced by the sector (or, if the sector analyzer forms part of a double focusing mass spectrometer, the final image produced by the spectrometer). FIG. 6 shows a series of curves 32–36, each of which illustrates the calculated variation of the magnetic field along the y axis for a particular spacing of the conductors along the y axis or spacing of the coils along the z axis. As previously explained, the effect of varying both parameters is identical in principle and differs only in scale. Considering first the case of variation resulting from different spacing of the conductors along the y axis, curve 32 is typical of the variation obtained with the widest spacing, curve 36 is typical of the narrowest spacing, and curves 33–35 represent intermediate cases. The range of the plot on each side of the y axis is approximately 50% of the distance from the ion trajectory to the centre of the conductor, and the range of magnetic field plotted is approximately 5% of the magnetic field along the y axis in the case of curve 36. Curves 35–32 represent equal increments in the distance between the centers of the conductors, each of about 5% of the value of the distance in the case of curve 36.

In the case illustrated, the curves have been calculated with conductor portions of width along the y axis approximately equal to the spacing between them, and of height (along the z axis) about twice the width. It can be seen that curve 36 represents the closest approximation to a homogeneous field along the y axis at the particular z spacing at which the curves were calculated. It will also be remembered that it is desirable to deliberately introduce a certain amount of second order inhomogeneity (i.e. field proportional to $y^2$), and it is clear from FIG. 6 that all the curves show a second order variation in the region close to y=0 and that the constant of proportionality is different in the case of each curve. Second order aberrations due to the $B_{11}\alpha^2$ term in equation 1 can therefore be corrected by adjusting the distance between the conductors along the y axis while maintaining an equal spacing about y=0. The change in the absolute field strength can of course be compensated by adjusting the current through the coils.

An exactly similar set of curves can be computed for the case of changing the z spacing of the coils while maintaining the distance between the conductors along the y axis at a constant value. In this case, curves 35–32 represent increments of about 6% in the spacing relative to the spacing used for curve 36. The coils are of the same cross section as those used in the previous calculations, and are symmetrically spaced about the x-y plane. Thus it can be seen that correction of the second order aberrations can be achieved by adjustment of either the y or z spacing of the conductors. In practice, when coils are used the y spacing is fixed during the manufacture of the coils, so that the best procedure for the design is to select the optimum y spacing at a z spacing slightly greater than the minimum allowed by the flight tube of the spectrometer, and to provide means for adjusting the z spacing to optimise the resolution of the mass spectrometer. Means for tilting the conductors to optimise the first order focusing may also be incorporated.

It will be appreciated that all the components of the spectrometer except the magnetic sector analyzer, eg the ion source and detector, vacuum system and electrostatic analyzer (in the case of double focusing mass spectrometers) are conventional and need not be described in detail. It will also be appreciated that because the field strength obtainable with the magnet shown in FIG. 7 is considerably lower than a value typical for an iron cored magnet, the magnetic sector radius of the spectrometer must be considerably higher than that of a conventional spectrometer if a useful mass range is to be obtained. However, special geometries have now been developed which allow physically small instruments of large radius to be constructed. (eg, as described in the above copending application).

FIG. 7 shows a practical form of an electromagnet constructed according to the invention and is a sectional view along the plane DD in FIG. 3. The conductor portions 7, 8, 9 and 10 are formed into two shaped coils 11 as shown in FIG. 3. Each coil consists of a number of turns of a copper tape, approximately 30 mm×0.5 mm, wound in a single layer coil with a thin sheet of a suitable insulating film (not shown) between the turns. Suitable materials include a polyimide film of the type used in transformer construction, but other types are also suitable. Each coil is wound on nonferromagnetic formers 16, 19 (FIG. 7) which are attached to cooling plates 17, 18. The formers are fabricated from a non-ferromagnetic material. Each coil is then "potted" in a suitable epoxy resin so that a thin layer 30 of resin provides insulation between the edges of the turns and the plates 17, 18, and the formers 16 and 19. Formers 16 and 19 are also secured to plates 17, 18 by means of pillars 31.

Each plate 17, 18 has a long continuous groove cut in its surface into which a cooling pipe 27 is inserted before the groove is filled with solder. The path of groove 27 can take any suitable route so that a coolant passed through inlet 28 into pipe 27 effectively cools the plates 17, 18, especially in the vicinity of the coil windings. Coolant then leaves through an outlet pipe (not shown). Good thermal contact between the coil windings and plates 17 and 18 is essential and insulating layer 30 should be as thin as possible. The epoxy resin used should also have a good thermal conductivity. Preferably also a slot should be cut across at least half the width of each plate 17 and 18 to prevent the plate acting like a shorted turn and increasing eddy current losses. The formers 16, 19 should be similarly treated if they are metallic.

The lower coil assembly (mounted on plate 18) is supported from the mass spectrometer bench 21 by means of four adjustable feet 22 and studs 23 so that its height can be accurately set relative to the vacuum envelope 20, which is preferably a tube of circular cross section. Obviously, tube 20 must be flattened in the regions where the ends of the coils pass over and under it.

Plate 17 and the upper coil assembly is supported by four adjustable length studs 25 each secured in the plates by four nuts 24. Studs 25 comprise two threaded rods with opposite handed threads joined by adjuster nut 29 so that rotation of nut 29 alters the length of the stud. Adjusters 29 are used to adjust the z spacing and the tilt whilst the spectrometer is operational, as previously explained. Studs 25 pass through slotted holes 26, allowing a y displacement of the two assemblies and correction of constructional defects. The y spacing of conductors 7 and 9, and 8 and 10, is of course determined in winding the coils.

It is of course important that all the parts of the magnet, and of the mass spectrometer bench 21 and flight tube 20 in the vicinity of the magnet, are made from non-ferromagnetic material. Attention must also be given to minimizing eddy current losses in conductive parts by ensuring that circulating electrical currents cannot flow in parts which are intersected by the magnetic flux. If this is not done, many of the advantages of the use of a non-ferromagnetic cored magnet will be nullified.

The power supply used to drive the magnet must be capable of producing a current high enough to give the required field (which may typically be several hundred amps) and be capable of regulating the current to a high degree of accuracy as well as changing it very rapidly. A variety of suitable designs are known in the art.

Obviously a magnetic sector spectrometer according to the invention can be built in other ways which will occur to those skilled in the art, and the embodiment shown in FIG. 7 is intended by way of example only.

Thus the invention may be seen to provide a magnetic sector spectrometer having a magnet with a non-ferromagnetic core which is capable of producing a sharply focused image, in which at least some of the second order aberrations have been eliminated. It also provides such a spectrometer additionally incorporating means for minimizing the second order aberrations substantially independently of the first order focusing characteristics. Furthermore the invention may be seen to provide a double focusing mass spectrometer incorporating a magnetic sector analyzer having a magnet with a non-ferromagnetic core in which a high resolution velocity focused final image is produced, and which incorporates a means for minimizing the second order focusing aberrations of the magnet sector.

We claim:

1. A mass spectrometer having a magnetic sector analyzer through which ions of a mass-to-charge ratio selected by said analyzer may travel along a substantially circular trajectory disposed in a first plane, said analyzer comprising at least two electrical conductor portions of substantially circular arcuate form, respectively of greater and smaller radius than said circular trajectory and disposed on radially opposite sides of a curved plane which is aligned with said circular trajectory and perpendicular to said first plane, and wherein substantially all of the magnetic flux generated by the passage of electrical current through said conductor portions passes only through non-ferromagnetic materials.

2. A mass spectrometer according to claim 1 in which said first plane is a plane of mirror symmetry and said electrical conductor portions are disposed symmetrically about said curved plane.

3. A mass spectrometer according to claim 1 in which four electrical conductor portions are provided, disposed with two of said portions on each side of said first plane.

4. A mass spectrometer according to claim 2 in which four conductor portions are provided, disposed with two of said conductor portions on each side of said first plane.

5. A mass spectrometer according to claim 3 in which a first distance separates the conductor portions on one side of said curved plane and a second distance separates the conductor portions on the other side of said curved plane and in which said first and second distances differ by an amount selected to set focal length of said analyzer to a desired value.

6. A mass spectrometer according to claim 3 in which a third distance separates the conductor portions on one side of said first plane and a fourth distance separates the conductor portions on the other side of said first plane, and in which said third and fourth distances are both selected to substantially minimize at least some of the second order aberrations of the final image produced by said mass spectrometer.

7. A mass spectrometer according to claim 5 in which a third distance separates the conductor portions on one side of said first plane and a fourth distance separates the conductor portions on the other side of said first plane, and in which said third and fourth distances are both selected to substantially minimize at least some of the second order aberrations of the final image produced by said mass spectrometer.

8. A mass spectrometer according to claim 3 in which a fifth distance separates the conductor portions on one side of said curved plane and a sixth distance separates the conductor portions on the other side of said curved plane, and in which said fifth and sixth distances are both selected to substantially minimize at least some of the second order aberrations of the final image produced by said mass spectrometer.

9. A mass spectrometer according to claim 5 in which a fifth distance separates the conductor portions on one side of said curved plane and a sixth distance separates the conductor portions on the other side of said curved plane, and in which said fifth and sixth distances are both selected to substantially minimize at least some of the second order aberrations of the final image produced by said mass spectrometer.

10. A mass spectrometer according to claim 6 in which a fifth distance separates the conductor portions on one side of said curved plane and a sixth distance separates the conductor portions on the other side of said curved plane, and in which said fifth and sixth distances are both selected to substantially minimize at least some of the second order aberrations of the final image produced by said mass spectrometer.

11. A mass spectrometer according to claim 3 wherein on one side of said first plane a seventh distance separates first conductor portions disposed on each side of said curved plane, and an eighth distance separates one of said first conductor portions from said curved plane, and on the other side of said first plane a ninth distance separates second conductor portions disposed on each side of said curved plane and a tenth distance separates one of said second conductor portions from said curved plane, and wherein said eighth and/or tenth distances are selected to set the angle between said first plane and a second plane equidistant from all said conductor portions and disposed on one side of said first conductor portions to a desired value.

12. A mass spectrometer according to claim 8 wherein on one side of said first plane a seventh distance separates first conductor portions disposed on each side of said curved plane, and an eighth distance separates one of said first conductor portions from said curved plane, and on the other side of said first plane a ninth distance separates second conductor portions disposed on each side of said curved plane and a tenth distance separates one of said second conductor portions from said curved plane, and wherein said eighth and/or tenth distances are selected to set the angle between said first plane and a second plane equidistant from all said conductor portions and disposed on one side of said first conductor portions to a desired value.

13. A mass spectrometer according to claim 3 in which conductor portions disposed on each side of said first plane are linked to form single-turn arcuate coils respectively disposed on each side of said first plane, each of said coils having a curved major axis substantially disposed in said curved plane.

14. A mass spectrometer according to claim 4 in which conductor portions disposed on each side of said first plane are linked to form single-turn arcuate coils respectively disposed on each side of said first plane, each of said coils having a curved major axis substantially disposed in said curved plane.

15. A mass spectrometer according to claim 5 in which conductor portions disposed on each side of said first plane are linked to form single-turn arcuate coils respectively disposed on each side of said first plane, each of said coils having a curved major axis substantially disposed in said curved plane.

16. A mass spectrometer according to claim 8 in which conductor portions disposed on each side of said first plane are linked to form single-turn arcuate coils respectively disposed on each side of said first plane, each of said coils having a curved major axis substantially disposed in said curved plane.

17. A mass spectrometer according to claim 13 in which each electrical conductor portion is of rectangular cross section disposed with the longest axis of said cross-section substantially parallel to said first plane.

18. A mass spectrometer according to claim 14 in which each electrical conductor portion is of rectangular cross section disposed with the longest axis of said cross-section substantially parallel to said first plane.

19. A mass spectrometer according to claim 15 in which each electrical conductor portion is of rectangular cross section disposed with the longest axis of said cross-section substantially parallel to said first plane.

20. A mass spectrometer according to claim 16 in which each electrical conductor portion is of rectangular cross section disposed with the longest axis of said cross-section substantially parallel to said first plane.

21. A mass spectrometer according to claim 13 in which said electrical conductor portions each comprises a plurality of electrical conductors.

22. A mass spectrometer according to claim 14 in which said electrical conductor portions each comprises a plurality of electrical conductors.

23. A mass spectrometer according to claim 15 in which said electrical conductor portions each comprises a plurality of electrical conductors.

24. A mass spectrometer according to claim 16 in which said electrical conductor portions each comprises a plurality of electrical conductors.

25. A mass spectrometer according to claim 21 in which said electrical conductors have a rectangular cross section and are disposed with the longest dimension of said cross-section substantially perpendicular to said first plane.

26. A mass spectrometer according to claim 22 in which said electrical conductors have a rectangular cross section and are disposed with the longest dimension of said cross-section substantially perpendicular to said first plane.

27. A mass spectrometer according to claim 23 in which said electrical conductors have a rectangular cross section and are disposed with the longest dimension of said cross-section substantially perpendicular to said first plane.

28. A mass spectrometer according to claim 24 in which said electrical conductors have a rectangular cross section and are disposed with the longest dimension of said cross-section substantially perpendicular to said first plane.

* * * * *